United States Patent
Kodawara (10) Patent No.: US 9,452,753 B2
(45) Date of Patent: Sep. 27, 2016

(54) CONTROL SYSTEM FOR A PLUG-IN HYBRID VEHICLE

(71) Applicant: Nissan Motor Co., Ltd., Yokohama-shi, Kanagawa (JP)

(72) Inventor: Tomoyuki Kodawara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/787,929

(22) PCT Filed: Mar. 26, 2014

(86) PCT No.: PCT/JP2014/058510
§ 371 (c)(1),
(2) Date: Oct. 29, 2015

(87) PCT Pub. No.: WO2014/196244
PCT Pub. Date: Dec. 11, 2014

(65) Prior Publication Data
US 2016/0090080 A1    Mar. 31, 2016

(30) Foreign Application Priority Data

Jun. 3, 2013    (JP) ................... 2013-117183

(51) Int. Cl.
*G06F 17/00* (2006.01)
*B60W 20/00* (2016.01)
(Continued)

(52) U.S. Cl.
CPC ............... *B60W 20/40* (2013.01); *B60K 6/28* (2013.01); *B60K 6/48* (2013.01); *B60K 6/543* (2013.01); *B60L 1/003* (2013.01); *B60L 3/0023* (2013.01); *B60L 7/14* (2013.01); *B60L 11/005* (2013.01); *B60L 11/14* (2013.01); *B60L 11/1816* (2013.01); *B60L 11/1861* (2013.01);
(Continued)

(58) Field of Classification Search
CPC .... B60W 20/40; B60W 10/08; B60W 10/06; B60W 2530/00; B60W 2710/06; B60W 2710/083; Y01S 903/93
USPC .......................................... 701/22; 180/65.1
See application file for complete search history.

(56) References Cited

U.S. PATENT DOCUMENTS 7,290,627 B1 * 11/2007 Gardner ................. B60K 6/442
180/65.1
2014/0210216 A1    7/2014 Konishi et al.
(Continued)

FOREIGN PATENT DOCUMENTS

EP    2 532 549 A2    12/2012
JP    5-328530 A      12/1993
(Continued)

*Primary Examiner* — McDieunel Marc
(74) *Attorney, Agent, or Firm* — Global IP Counselors, LLP (57) ABSTRACT

A hybrid vehicle control device includes a drive system including a starter motor, an engine and a motor/generator, and a power supply system including a high power battery, a capacitor, and a hybrid control module which controls charging and discharging of the capacitor. The hybrid control module performs a starter start-up control, a motor-generator start control and charging and discharging control: during EV mode, when the operating point in accordance with the vehicle speed and required driving force is present in a M/G start-up region, the hybrid control module maintains the capacitor voltage at or below a deterioration free voltage, and when the operating point is deviated from the M/G start-up region, the hybrid control module recharges the capacitor to or above a starter start-up permission voltage.

4 Claims, 5 Drawing Sheets (51) Int. Cl.
*B60K 6/28* (2007.10)
*B60K 6/48* (2007.10)
*B60L 11/14* (2006.01)
*B60W 10/26* (2006.01)
*B60L 1/00* (2006.01)
*B60L 3/00* (2006.01)
*B60L 7/14* (2006.01)
*B60L 11/00* (2006.01)
*B60L 11/18* (2006.01)
*B60L 15/20* (2006.01)
*B60K 6/543* (2007.10)
*B60W 10/06* (2006.01)
*B60W 10/08* (2006.01)

(52) U.S. Cl.
CPC .......... *B60L 11/1868* (2013.01); *B60L 15/20* (2013.01); *B60L 15/2009* (2013.01); *B60W 10/06* (2013.01); *B60W 10/08* (2013.01); *B60W 10/26* (2013.01); *B60L 2210/10* (2013.01); *B60L 2210/20* (2013.01); *B60L 2210/30* (2013.01); *B60L 2220/14* (2013.01); *B60L 2240/12* (2013.01); *B60L 2240/36* (2013.01); *B60L 2240/423* (2013.01); *B60L 2240/545* (2013.01); *B60W 2530/00* (2013.01); *B60W 2710/06* (2013.01); *B60W 2710/083* (2013.01); *B60Y 2400/114* (2013.01); *B60Y 2400/214* (2013.01); *Y02T 10/6221* (2013.01); *Y02T 10/645* (2013.01); *Y02T 10/70* (2013.01); *Y02T 10/7005* (2013.01); *Y02T 10/7022* (2013.01); *Y02T 10/7044* (2013.01); *Y02T 10/7066* (2013.01); *Y02T 10/7072* (2013.01); *Y02T 10/7077* (2013.01); *Y02T 10/725* (2013.01); *Y02T 10/7216* (2013.01); *Y02T 10/7241* (2013.01); *Y02T 10/7275* (2013.01); *Y02T 90/127* (2013.01); *Y02T 90/14* (2013.01); *Y10S 903/93* (2013.01)

(56) References Cited

U.S. PATENT DOCUMENTS

| 2016/0082943 A1* | 3/2016 | Kodawara | B60K 6/48 701/22 |
| 2016/0090080 A1* | 3/2016 | Kodawara | B60L 1/003 701/22 |
| 2016/0107635 A1* | 4/2016 | Kodawara | B60K 6/48 701/22 |

FOREIGN PATENT DOCUMENTS

| JP | 2007-98977 A | 4/2007 |
| JP | 2008-141855 A | 6/2008 |
| JP | 2012-167627 A | 9/2012 |
| JP | 2012-250676 A | 12/2012 |
| WO | 2013/038857 A1 | 3/2013 |

* cited by examiner

CONTROL SYSTEM FOR A PLUG-IN HYBRID VEHICLE

CROSS-REFERENCE TO RELATED APPLICATIONS

This application is a U.S. National stage application of International Application No. PCT/JP2014/058510, filed Mar. 26, 2014, which claims priority based on the Japanese Patent Application No. 2013-117183, filed in Japan Patent Office on Jun. 3, 2013, the contents of each of which is hereby incorporated herein by reference

BACKGROUND

1. Field of the Invention

The present invention relates to a control system for a plug-in hybrid vehicle with a starter motor having a capacitor as a power supply in which a starter start-up and an M/G start-up are available as an engine start-up method.

2. Background Information

Conventionally, a power storage device is known in which the voltage of the power storage device is controlled between a preset lower limit voltage and a preset holding or sustaining voltage when the vehicle is not in use while the storage device is configured to be fully charged when the vehicle recognizes the driver though a vehicle driver authentication mechanism (for example, see JP 2008-141855 A).

SUMMARY

However, in the conventional device, when the driver turns on an ignition switch after getting in the vehicle, the storage device will be fully charged based on the recognition of the driver. Thus, although an engine start-up using the starter motor is ensured when the ignition is turned on, the storage device is maintained in a full charge state. Therefore, a problem arises that deterioration of the power storage device proceeds due to an increase in the internal resistance of power storage device.

The present invention was made in consideration of the above problem and aims to provide a control system for a plug-in hybrid vehicle that can achieve suppression of a progression of the deterioration of the capacitor when the ignition is ON, while ensuring the start-up operation using the starter initiated start-up.

In order to achieve the above object, the present invention has a starter motor, an engine, and a motor/generator (M/G) in the driving system. As power supply system, a high voltage battery for a power supply of the motor/generator, a capacitor for a power supply of the starter motor, and a capacitor charge and discharge control unit for controlling charging and discharging of the capacitor are provided, respectively. In the control system for the hybrid vehicle, an engine start-up control unit, an M/G start-up control unit, and an engine start-up region map setting unit are provided. The starter start-up control unit is configured to crank the engine for starter start-up using a starter motor powered by the capacitor.

The M/G start-up control unit is configured to crank the engine for M/G start-up using the motor/generator powered by the high voltage battery.

The engine start region map setting unit is configured, during the selection of the EV mode driven by the motor/generator, to set an engine start region map for setting an M/G start-up region by subtracting an engine cranking required torque from an EV region defined by the maximum motor output torque characteristics with respect to the vehicle speed. The capacitor charge and discharge control unit is configured, during selection of the EV mode, to set the capacitor voltage at or below the deterioration free voltage at which deterioration does not proceed when an operating point determined by the vehicle speed and the required driving force is present in the M/G start-up region, while recharging the capacitor to and above a starter start-up permission voltage when the operating point determined by the vehicle speed and the required driving force is deviated from the M/G start-up region.

Therefore, during selection of the EV mode, when the operating point determined by the vehicle speed and the required driving force is present in the M/G start-up region, the capacitor voltage is maintained at or below the deterioration free voltage at which deterioration or gradation does not proceed. Further, when the operating point due to the vehicle speed and the required driving force deviates from the M/G start-up region, the capacitor is recharged to or above the starter start-up permission voltage. In other words, due to the starter start-up powered by the capacitor, all the M/G torque can be dedicated to EV traveling. However, in the M/G start-up region, since the engine can be cranked using the motor/generator, no need exists for the starter start-up. Therefore, unless the operating point defined by the vehicle speed and the required driving force leaves the M/G start-up region to enter the starter start-up region, it is possible to suppress the capacitor from deterioration progress by keeping the capacitor voltage at or below the deterioration free voltage. Therefore, when selecting the EV mode and the operating point is present in the M/G start-up region, the capacitor voltage is maintained at or below the deterioration free voltage, and, when the operating point is deviated from the M/G start-up region, the capacitor is recharged to and above the starter start-up permission or enabling voltage. Consequently, it is possible, during selection of the EV mode, to suppress deterioration of the capacitor, while ensuring the engine start-up.

BRIEF DESCRIPTION OF THE DRAWINGS

Referring now to the attached drawings which form a part of this original disclosure.

DETAILED DESCRIPTION OF THE EMBODIMENTS

Below, the best mode for implementing the control system of the plug-in hybrid vehicle according to the present invention will be described based on a first embodiment shown in the drawings.

First Embodiment

First, a description is given of the configuration. The configuration of the FF plug-in hybrid vehicle employing the control system of the first embodiment (an example of a plug-in hybrid vehicle) is described separately in a "Drive System Configuration", "Power Supply System Configuration", "Control System Configuration", and "Detailed Configuration of Capacitor Charge and Discharge Control".

Drive System Configuration

Figure 1:
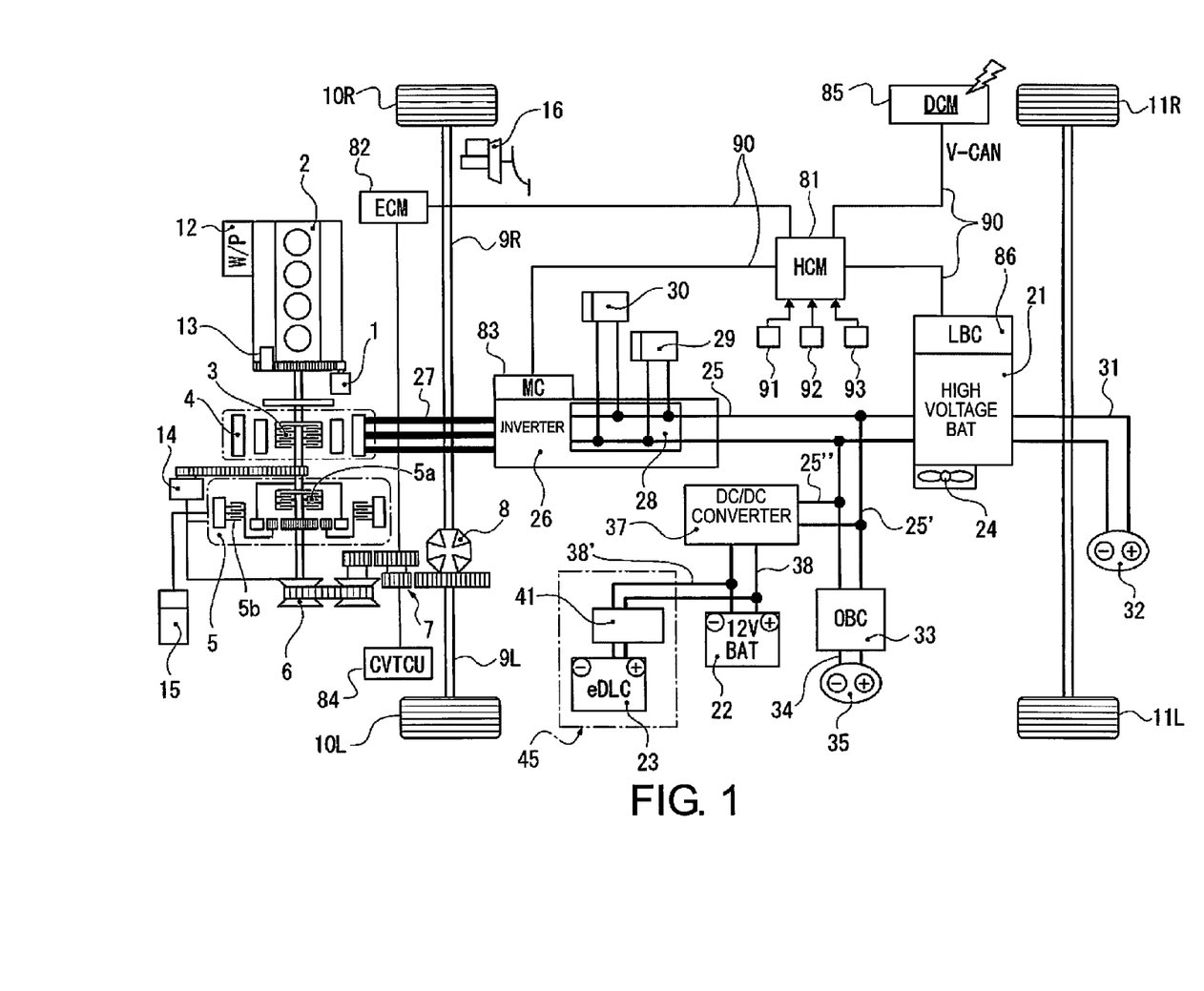
FIG. 1 is an overall system diagram showing an FF plug-in hybrid vehicle to which the control system of a first embodiment is applied.

FIG. 1 is an overall system diagram showing an FF plug-in hybrid vehicle. Below, a description is given of a drive system configuration of the FF plug-in hybrid vehicle.

As shown in FIG. 1, as the drive system, a starter motor 1 (abbreviated as "M"), a transverse engine (abbreviated as "ICE"), a first clutch 3 (abbreviated as "CL1"), a motor/generator 4 (abbreviated as "M/G"), a second clutch 5 (abbreviated as "CL2"), and a belt-type continuously variable transmission (abbreviated as "CVT") are provided. An output axis of the belt-type CVT 6 is drivingly connected to left and right front wheels 10R, 10L via a final reduction gear train 7, a differential gear 8, and the left and right drive shafts 9R, 9L. Note that the left and right rear wheels 11R, 11L are configured as driven wheels.

The starter motor 1 has a gear that meshes with an engine starting gear disposed on the crankshaft of the engine 2 and is powered by a capacitor 23 to be described below and forms a cranking motor for driving or rotating the crankshaft when the engine is started.

The transverse engine 2 is an engine which is arranged in the front room with the crankshaft direction in the vehicle width direction, and has an electric water pump 12, a crank shaft rotation sensor 13 for detecting the reverse rotation of the engine 2 of the transverse engine 2.

The first clutch 3 is a hydraulic dry, multi-plate friction clutch interposed between the transverse engine 2 and the motor/generator 4, which is subject to selective control by a first clutch oil pressure to complete engagement/slip-engagement/release.

The motor/generator 4 is a permanent magnet synchronous motor of three-phase alternating current type connected to the transverse engine 2 via the first clutch 3. The motor/generator 4 is driven by a power supply of the high voltage battery 21 to be described below. The starter coil of the motor/generator is connected via an AC harness to an inverter 26, which converts a direct current to a three-phase current during a driving operation while converting the three phase current to direct current during regeneration.

The second clutch 5 is a hydraulic wet-type multi-plate friction clutch interposed between the motor/generator 4 and the left and right front wheels representing driving wheels, and is subject to selective control by a second clutch hydraulic pressure to the full engagement/slip-engagement/release. The second clutch 5 makes use of a forward clutch 5a and a reverse brake 5b provided for forward-reverse switching mechanism. That is, during forward traveling, the forward clutch 5a acts as the second clutch 5, while, during backward traveling, the reverse brake 5b serves as the second clutch 5.

The belt-type continuously variable transmission 6 is a transmission for obtaining a stepless or continuous speed change ratio by changing the winding diameter of the belt by shift hydraulic pressures to the primary fluid chamber and the secondary fluid chamber. The belt-type continuously variable transmission 6 includes a main oil pump 14 (mechanical drive), a sub oil pump 15 (motor driven), a control valve unit (not shown) that produces a first clutch hydraulic pressure and a shift hydraulic pressure using as a source pressure a line pressure that is obtained by pressure regulating the pump discharge pressure.

The first clutch 3, the motor/generator 4, and the second clutch 5 constitute a one-motor-two-clutch drive system which operates as main drive modes according to the drive system in "EV mode", and "HEV mode". The "EV mode" represents an electric vehicle mode in which the motor/generator is the only driving source with the first clutch 3 released and the second clutch engaged. Travelling in the "EV mode" is referred to as "EV running". The "HEV mode" represents a hybrid vehicle mode in which the transverse engine 2 and the motor/generator 4 act as power sources with both clutches 3, 5 engaged. Travelling in the "HEV mode" is referred to as "HEV running".

The motor/generator 4 is equipped with a regenerative cooperative brake unit 16 which controls the total braking torque during the braking operation basically in response to a regenerative operation during braking operation. The regenerative cooperative brake unit 16 includes a brake pedal, an electric booster, and a master cylinder. The electric booster carries out a coordinated control of regenerative part/hydraulic part allocation such that, during the braking operation, the amount that is obtained by subtracting from a required braking force represented by a brake pedal operation amount an available regenerating braking force will be borne by the hydraulic braking force.

Power Supply System Configuration

Figure 2:
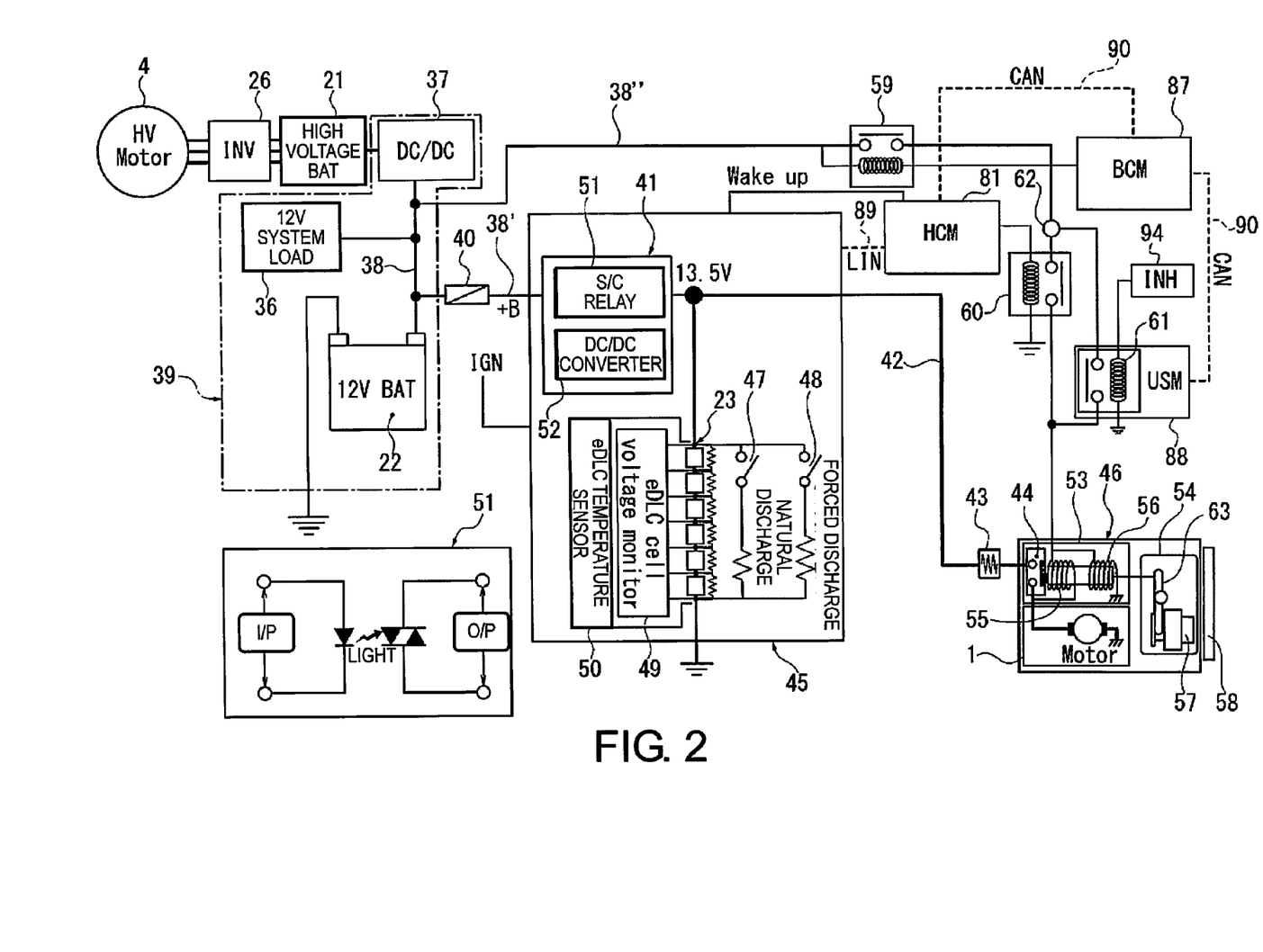
FIG. 2 is a power supply circuit diagram showing a power supply system arrangement with a focus on a starter power supply source of the FF plug-in hybrid vehicle to which the control system of the first embodiment is applied.

FIG. 1 is an overall system diagram showing an FF plug-in hybrid vehicle, and FIG. 2 is a power supply circuit diagram with focus on the starter power supply. Below, with reference to FIGS. 1 and 2, a description is given of the power supply system configuration for the FF plug-in hybrid vehicle.

As the power supply system, as shown in FIG. 1, a high voltage battery 21 as a motor/generator power, and a 12V battery 22 as a 12V system load power, and a capacitor 23 as a starter power supply, respectively.

The high voltage battery 21 is a rechargeable or secondary battery mounted as a power source of the motor/generator 4, and uses, for example, lithium ion battery. One or more of cell modules formed by laminating a plurality of cells is stored within a battery case. A junction box is accommodated in the high voltage battery 21, which aggregates relay circuits for supply/cutoff/distribution of high power. Further, a battery temperature adjustment unit 24 for an air-conditioning function and lithium battery controller 86 for monitoring the battery charge capacity (battery state of charge; battery SOC) and the battery temperature are attached.

The high voltage battery 21 and the motor/generator 4 are connected through a DC harness 25, an inverter 26, and an AC harness 27. A junction box 28 which aggregates relay circuits of the supply/cutoff/distribution for high voltage is accommodated in the inverter 26. Further, the air-conditioning circuit 29, an electric air compressor 30, and a motor controller 83 to perform a power running/regenerative control are attached. In other words, the inverter 26 converts the direct current from the DC wiring harness into a three phase alternating current to the AC wiring harness 27 when the inverter 26 drives the motor/generator 4 due to discharge of the high voltage battery 21 during a driving mode. When the high voltage battery 21 is charged during a regenerative mode by power of the motor/generator 4, the three phase AC from the AC wiring harness 27 is converted into the direct current to the DC wiring harness 25.

In addition to a rapid external charging port 32 connected to the high voltage battery 21 through a DC harness 31, a normal external charging port 35 is connected to the high voltage battery 21 via a DC branch harness 25', a charger 33 and the AC harness 34. The charger 33 functions to a voltage conversion and AC/DC conversion. When rapid external charging, for example, an external charging is performed by connecting a connector plug of a charging station installed in the road or the like to the rapid external charging port 32 (rapid external charging). During the normal external charging, for example, a connector plug from the household power supply is connected to the normal external charging port 35 for external charging (normal external charging).

The 12V battery 22 is a rechargeable secondary battery mounted as a power source of 12V system load 36 representing the other auxiliary equipment except the starter motor 1. For example, a lead battery is used which is generally mounted in the engine vehicle. The high voltage battery 21 and the 12V battery 22 are connected via DC branch harness 25", a DC/DC converter 37, and a battery harness 38. The DC/DC converter 37 is intended to convert the several hundred volts voltage from the high voltage battery 21 to 12V. By controlling the DC/DC converter by the hybrid control module 81, the charge capacity of the 12V battery is configured to be managed.

The capacitor 23 is a storage device that is mounted as a dedicated power supply of the starter motor 1. A capacitor called an electric double layer capacitor (eDLC: electric Double Layer Capacitor) is used, which has a large capacitance and excellent characteristics in quick charging and discharging performance. As shown in FIG. 2, the auxiliary load power supply system 39 and the capacitor 23 are connected via a battery branch harness 38' provided with a fuse 40 and a capacitor charging circuit 41. The capacitor 23 and the starter motor 1 are connected via a capacitor harness 42, a resistor 43 and a relay switch 44. In addition, a DLC unit 45 is configured by the capacitor 23 and the capacitor charging circuit 41 while a starter unit 46 is configured by the starter motor 1, the relay switch 44, and the like. Below, a description of the detailed configuration of the DLC unit 45 and the starter unit 46 is given below.

As shown in FIG. 2, the DCL unit 45 is provided with the capacitor 23, a capacitor charging circuit 41, a self-discharge switch 47, a forced discharge switch 48, a cell voltage monitor 49 (the capacitor voltage detecting unit), and a capacitor temperature sensor 50.

The capacitor 23 is formed by connecting a plurality of DLC cells in series/parallel. The self-discharge switch 47, the forced discharge switch 48, and the capacitor temperature sensor 50 are disposed on both ends of the plurality of DLC cells in parallel. Further, the cell voltage monitor 49 is provided parallel to each of DLC cells so as to detect a cell voltage (=capacitor capacity) of each cell of the plurality of DLC cells.

The capacitor charging circuit 41 is formed by a DC/DC converter circuit integrating semiconductor switching relays (combination circuit of switching elements, choke coils, capacitors, and a diode). The capacitor charging circuit 41 includes a semiconductor relay 51 and a DC/DC converter 52 controlled by the hybrid control module 81. The semiconductor relay 51 is a non-contact relay with light semiconductor switching elements, for example, as shown schematically in the lower left portion in FIG. 2, called as a photo-coupler for transmitting optical signals in the space of the insulated input and output. The semiconductor relay 51 has a switching function to connect or disconnect the capacitor 23 to or from the auxiliary load power supply system 38. The DC/DC converter 52 is configured to subdivide a DC input into pulse current by the switching element and connect these to obtain the direct current output of required voltage. Thus the DC/DC converter includes the function of converting the 12V direct current to the 13.5 V direct current as well as switching the capacitor charge current.

The starter unit 46 includes a starter motor 1, a relay switch 44, an electromagnetic actuator 53, and a pinion shifting mechanism 54.

The electromagnetic actuator 53, by an electromagnetic force generated by energizing the two coils 55 and 56 causes the pinion 57 to a position meshing with the ring gear 58 in addition to turning the relay switch 44 on. When cutting off the current, in addition to turning off the relay switch 44, the pinion 57 will be shifted to a position released from meshing with the ring gear 58. Note that the ring gear 58 is mounted to a crankshaft of the transverse engine 2. The auxiliary load power supply system 39 and two coils 55, 56 are connected via a battery branch harness 38" including a starter cutoff relay 59, a HEV/IS/relay 60, and a starter relay 61. The energization/shut-off of the starter cutoff relay 59 is carried out by a body control module 87. The energization/shut-off the HEV/IS/relay 60 is made by the hybrid control module 81. The energization/shut-off of the starter relay 61 is made by an under-hood switching module 88. Note that, at a crossing position of the battery branch harness 38", a voltage sensor 62 for diagnosing the relay is provided.

The pinion shifting mechanism 54 is provided with a pinion 57 which is axially moveable relative to the motor shaft of the starter motor 1 and a shift lever connected at its one end to an electromagnetic actuator 53 and fitted at the other end into the shift groove of the pinion 57.

Control System Configuration

Figure 3:
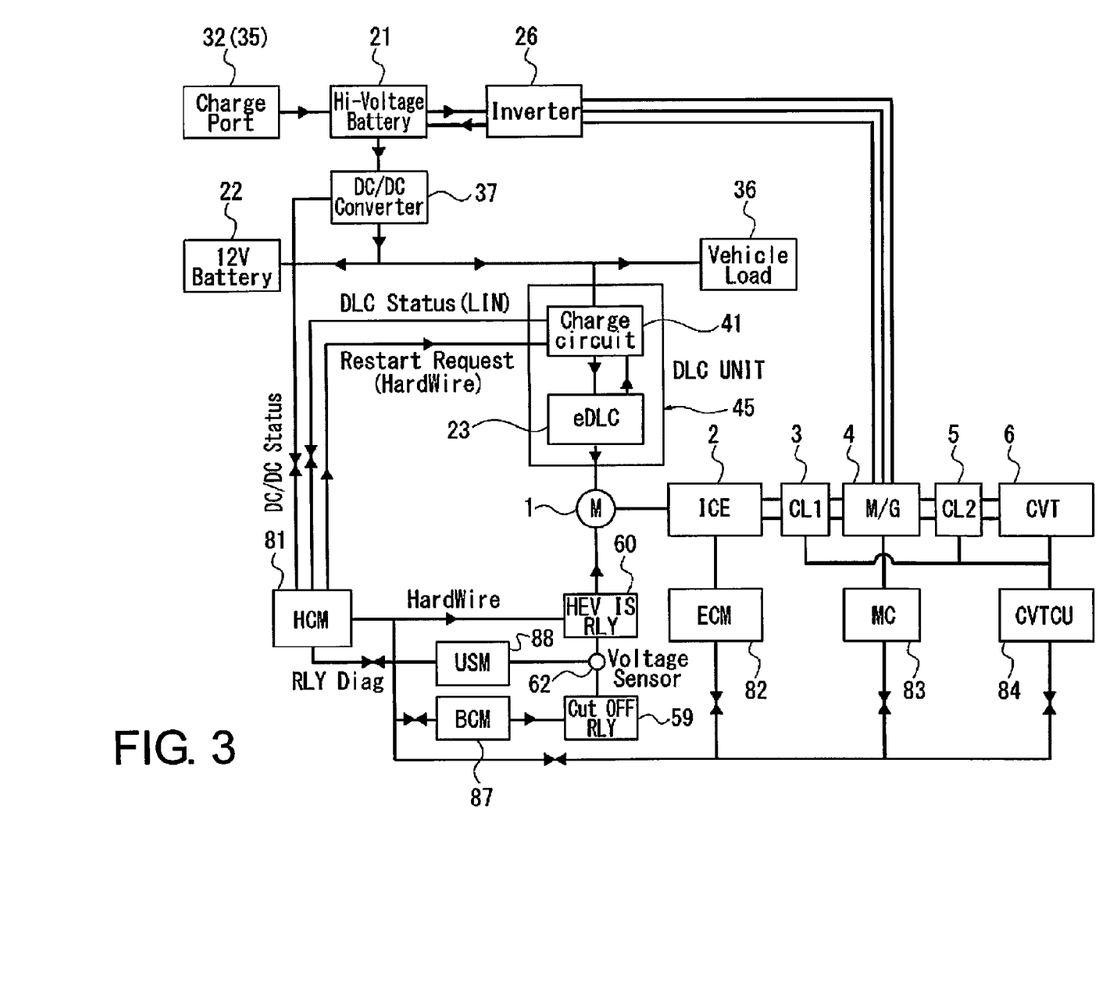
FIG. 3 is a block diagram showing a control system configuration of the FF plug-in hybrid vehicle to which the control system of the first embodiment is applied.

FIG. 1 shows the overall system of the FF plug-in hybrid vehicle. FIG. 2 shows the power system configuration around the starter power supply, FIG. 3 shows a control system configuration. Hereinafter, based on FIGS. 1 to 3, illustrating a control system configuration of the FF plug-in hybrid vehicle.

As shown in FIGS. 1 to 3, as the control system, the hybrid control module 81 (abbreviated as "HCM") is an integrated control unit that controls appropriately the energy consumed by the overall vehicle. An engine control module 82 (abbreviated as "ECM"), the motor controller 83 (abbreviated as "MC"), a CVT control unit 84 (abbreviated as "CVTCU") are units connected to the hybrid control module 81. Further, a data communication module 85 (abbreviated as "DCM"), a lithium battery controller 86 (abbreviated as "LBC") are provided. In addition, the body control module 87 (abbreviated as "BCM") and an under-hood switching module 88 (abbreviated as "USM") are provided. These control units are connected so as to be bi-directionally communicative through a CAN communication line 90 (CAN is an abbreviation of "Controller Area Network") except for a LIN communication line 89 (LIN: abbreviation for Local Interconnect Network) through which the hybrid control module 81 and the DCL unit 45 are connected each other.

The hybrid control module 81 executes various controls based on input information from each control unit, ignition switch 91, accelerator pedal opening sensor 92, a vehicle speed sensor and the like. Among them, the control that is intended to drive a FF plug-in hybrid vehicle for which an external charging is available at a high fuel consumption efficiency is referred to as the selection control of the running mode ("CD mode" and "CS mode") based on a battery SOC of the high voltage battery 21 (Running Mode Selection Control Unit).

During the "CD mode (Charge Depleting mode)", in principle, a priority is placed on an EV mode in which power of the high voltage battery is consumed, and the "CD mode" is selected during a period in which the battery SOC decreases from the full SOC to a predetermined SOC. However, in a high load running so that the driving force would be insufficient in EV running, the HEV running mode is performed exceptionally. Basically, the starting operation of the transverse engine 2 during the "CD mode" being selected, start by the starter motor 1 (starter start-up) is a basic operation. The start by the motor/generator 4 (M/G start) is thus held exceptional.

The "CS mode (Charge Sustain mode)" refers to a mode in which, in principle, a priority is placed on the HEV running to maintain the power of the high voltage battery 21, and is selected as the battery SOC of the high voltage battery 21 is below the preset SOC. That is, when the battery SOC of the high voltage battery 21 is required to be sustained or maintained in a predetermined range, the HEV running is carried out by an engine power to generate the motor/generator 4. Note that the predetermined mode switching threshold, i.e. the preset SOC is set such that between a value from the CD mode to the CS mode and a value from the CS mode to the CD mode a hysteresis is provided.

The hybrid control module 81, in addition to the selection control between the "CD mode" and "CS mode", performs an engine start-up control by the starter motor 1, a charging control to charge the capacitor 23, and the discharge control from the capacitor 23.

Also, starter related controls such as below will be carried out.
(A) Time reduction control from starting the engine until the starter start-up permission.
(B) Time reduction control from the ignition on until the starter start-up permission.
(C) Deterioration progress suppression control of the capacitor 23
(FIRST EMBODIMENT).
(D) High temperature/low temperature countermeasure control of the capacitor 23.
(E) Voltage sag prevention control of the vehicle auxiliary equipment.

The engine control module 82 performs a fuel injection control, an ignition control, a fuel-cut control, etc. of the transverse engine 2. The motor controller 83 performs a power driving control and regenerative control of the motor generator 4 by the inverter 26. The CVT control unit 84 performs an engagement pressure control of the first clutch 3, an engagement pressure control of the second clutch 5, a shifting hydraulic pressure control of the belt-type continuously variable transmission 6, etc. The data communication module 85, in response to remote operation of a switch of a portable remote control key and the communication being established between the portable remote control key, performs, for example, control of the locking/unlocking of a charge port lid and/or a connector locking mechanism. The lithium battery controller 86 manages a battery SOC and a battery temperature. The body control module 87 controls energization/de-energization of a starter cutoff relay 59. Finally, the under-hood switching module 87 performs energization/de-energization of a starter relay 61 incorporated therein based on a range select signal from an inhibitor switch 94.

Detailed Configuration of Capacitor Charge and Discharge Control

Figure 4:
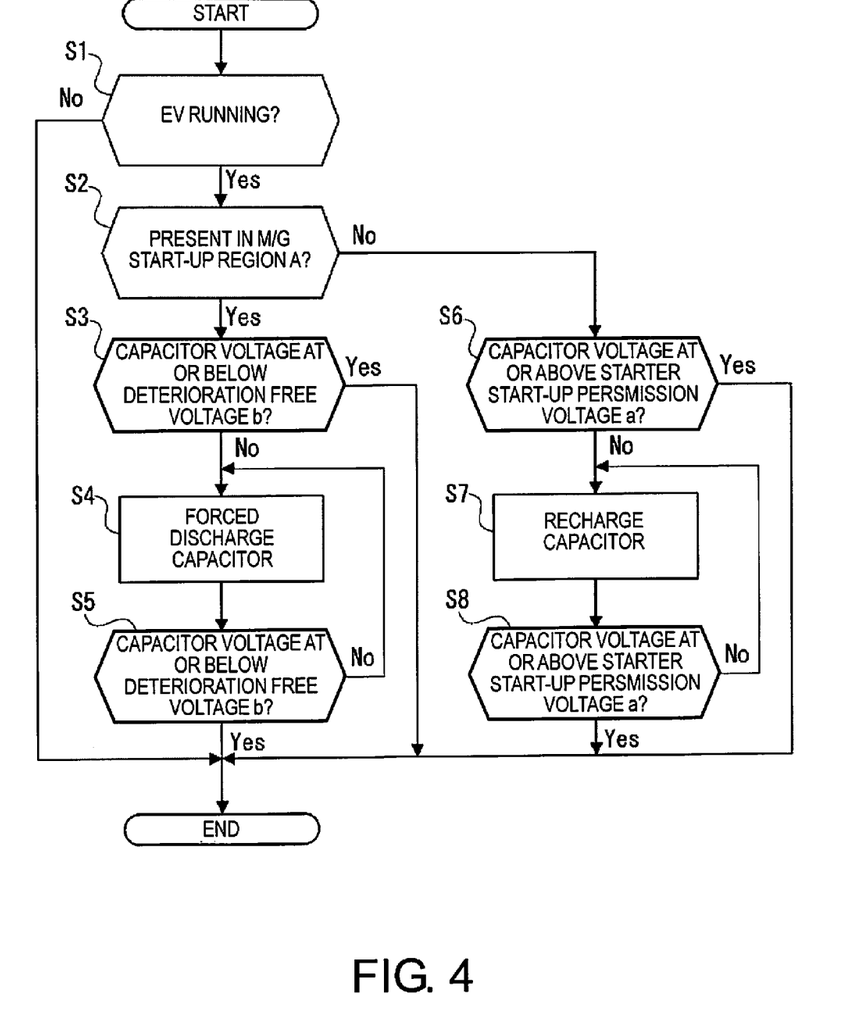
FIG. 4 is a flowchart showing a flow of a capacitor charge and discharge control process executed by a hybrid control module of the first embodiment.

FIG. 4 shows a capacitor charge and discharge control processing flow executed by the hybrid control module 81 (capacitor charge and discharge control unit). Below, a description is given of each step representing a capacitor charging and discharging control processing configuration.

In step S1, it is determined whether or not EV running is in place in which the EV mode is selected using the motor/generator 4 as driving source. If Yes (EV running), control proceeds to step S2, while, if NO (HEV running), control ends.

Figure 5:
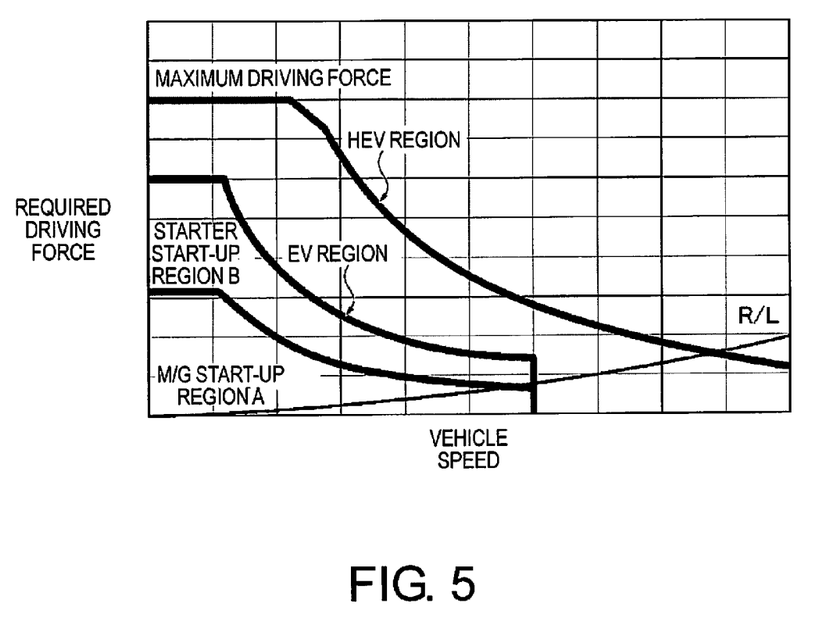
FIG. 5 is a map showing the engine start-up region map in which the EV region defined by a vehicle speed axis and a required driving force axis is divided into an M/G start-up region and a starter start-up region.

In step S2, subsequent to the determination in step S1 that the EV running is in place, by referring to an engine start-up region map shown in FIG. 5, it is determined whether or not the operating point determined by a vehicle speed and a required driving force (for example, accelerator opening) is present in the M/G start-up region A in the engine start-up region map. If Yes (present in the M/G start-up region A), control proceeds to step S3, while, if No (present in the starter start-up region B), control proceeds to step S6.

Here, the engine start-up region map sets the M/G start-up region A by subtracting a required torque required for engine cranking from the EV region defined by a maximum motor output torque characteristic with respect to the vehicle speed. Further, although the entire region is originally defined as the starter start-up region, associated with setting of the M/G start-up region, the starter start-up region B is set by subtracting the M/G start-up region A from the EV region (engine start-up region map setting unit).

In step S3, subsequent to the determination in step S2 that the operating point is present in the M/G start-up region A, it is determined whether or not the capacitor voltage is at or below a deterioration free voltage b at which deterioration does not proceed. If Yes (capacitor voltage≤voltage b), control ends, whereas, in the case of No (capacitor voltage>Voltage b), control proceeds to step S4.

Here, the "voltage b at which deterioration would not proceed or deterioration free voltage" is set to 6.0 V in the case of six cells connected in series, since it has been discovered that the degradation or deterioration would not proceed if per cell capacitor 23 is less than 1V.

In step S4, subsequent to the determination in Step S3 or S5 that capacitor voltage>Voltage b, a forced discharge switch 48 is closed to forcibly discharge the capacitor 23 and control proceeds to step S5.

Here, the capacitor forced discharge is carried out by current 3 representing a normal discharge current.

In step S5, subsequent to the capacitor forced discharge in step S4, it is determined whether or not the capacitor voltage is equal to the deterioration free voltage b or below. If Yes (capacitor voltage≤voltage b), control ends, while, in the case of No (capacitor voltage>Voltage b), control returns to step S4.

Here, as the "voltage b at which deterioration would not proceed", the same voltage value as the step S3 is used.

In step S6, subsequent to the determination in step S2 that the operating point is present in the starter start-up region B, it is determined whether or not the capacitor voltage is at or above the starter start-up permission or enabling voltage a. If Yes (capacitor voltage≥starter start-up permission voltage a) control ends, while, if No (capacitor voltage<voltage b), control proceeds to step S7.

Here, the "starter start-up permission voltage a" is set about 12.5 V at which the required time for starter start-up is within a target time when the capacitor 23 in the first embodiment exhibits a capacitor voltage of 13.5 V, for example, at a full charge state thereof.

In step S7, subsequent to the determination in step S6 or S8 that capacitor voltage<starter start permission voltage a, the normal current 1 (for example, 15 A) is selected as charging current to suppress the capacitor deterioration to recharge the capacitor 23 with current 1, and control proceeds to step S8.

In step S8, subsequent to the capacitor recharge in step S7, it is determined whether or not the capacitor voltage is at or above the starter start-up permission voltage a. If Yes (capacitor voltage≥starter start-up permission voltage a), control ends. If No (capacitor voltage<starter start-up permission voltage a), control returns to step S7. Here, as the "starter start-up permission voltage a", the same value as in step S6 is used.

Now, a description of the operation is given. The operation in the control unit of the FF plug-in hybrid vehicle of the first embodiment, description is given in Characteristic Operation by Capacitor Power Supply Circuit Configuration, Charge and Discharge Operation of Capacitor Power Supply, and Capacitor Charge and Discharge Control Operation During EV running, separately.

Characteristic Operation by Capacitor Power Supply Circuit Configuration

For example, in the idle stop vehicles, in the case where the power supply of the starter motor is set to a 12V battery, the power supply circuitry will be configured to be the capacitor power supply circuit configuration of the first embodiment with the DLC unit 45 and the fuse 40 excluded, which is now referred to as Comparative Example.

In this Comparative Example, a single 12V battery is commonly shared by the starter motor and the power source of the vehicle auxiliary equipment. Thus, when the power requirements is high for the vehicle auxiliary equipment, in response to an engine start-up by the starter motor, due to shortage of supply power, at the instant of the engine starting, an instantaneous voltage drop occurs with which the voltage of the vehicle auxiliary equipment abruptly falls.

In contrast, in the first embodiment, the auxiliary load power supply system 39 is configured by connecting the high voltage battery 21 and the 12V battery 22 via the DC/DC converter 37. The DLC unit 45 is configured to include the capacitor charging circuit 41 that is connected by branching from the DC/DC converter 37, and the capacitor connected to the capacitor charging circuit 41. Further, the capacitor power supply circuit is configured by a semiconductor relay 51 as a switch incorporated in the capacity charge circuit 41 between the auxiliary load power supply system 39 and the DLC unit 45.

Through this configuration, while charging the 12V battery 22 and the capacitor 23 by the power from the high voltage battery 21, the 12V battery 22 supplies the necessary power to the 12V system load 36 of the vehicle auxiliary equipment, and the capacitor 23 supplies the necessary power to the starter motor 1. That is, the power supply is not shared between the starter motor 1 and the 12V system load 36. Further, the two power supplies, i.e. the 12V battery 22 and the capacitor 23 are subjected to charge back up by the high voltage battery 21.

Further, without modifying the power supply circuit configuration of the idle stop vehicle of Comparative Example, by adding the DLC unit 45 (capacitor charging circuit 41+capacitor 23), the capacitor power supply circuit may be configured. Thus, since the DLC unit 45 may be added in a similar manner as addition of the auxiliary equipment, it is not necessary for the control of the high voltage battery 21 and the DC/DC converter 37 to be modified from the control of Comparative Example.

Furthermore, when the charge and discharge balance of the auxiliary load power supply system 39 is likely to collapse, the DLC unit 45 (capacitor charging circuit 41+capacitor 23) is capable of controlling the charging current, and may be separated from the auxiliary load power supply system 39 by the semiconductor relay 51 representing a switch. Therefore, by keeping open the semiconductor relay 51 at the time of starter start-up, it is possible to prevent the voltage of the vehicle auxiliary equipment from being decreased suddenly. In addition, there is no need to change the converter capacity of the DC/DC converter 37 and the battery capacity of the 12V battery 22 from the converter capacity and battery capacity set in Comparative Example.

Charge and Discharge Operation of Capacitor Power Supply

With respect to the capacitor power supply circuit, a description is given of "Engine start-up control operation by the starter motor 1", "Charge control operation to the capacitor 23", and "Discharge control operation from the capacitor 23" respectively performed by the hybrid control module 81.

At the time of an engine start-up by the starter motor 1, in response to the output of the starter start-up command from the hybrid control module 81, when the HEV/IS/Relay 60 is energized, the relay switch 44 is turned on to shift the pinion 57 to a position where the pinion 57 engages with the ring gear 58. Thus, the starter start-up is performed by the starter motor 1 powered by the capacitor 23 to rotate the crankshaft of the transverse engine 2, and the HEV/IS/Relay 60 is shut off after a predetermined time has elapsed of the energization. Incidentally, the starter cut-off relay 59, except when the vehicle condition for prohibiting engine start is satisfied, energization is maintained by the body control module 87. Also, the starter relay 61 built in the under-hood switching module 88 is energized only during the selection of the P range. A cut-off state is maintained at the time of selection of the D range and the like other than the P range.

Accordingly, during the engine start-up control by the starter motor 1, as a rule, while the HEV/IS/Relay 60 is energized by the starter start command in the starter start-up permission conditions, the starter motor 1 is driven by using the electric power of the capacitor 23 to start up the transverse engine 2 (starter start-up control unit).

Note that another control is provided in which, in order to start the transverse engine 2, the motor/generator 4 powered by the high voltage battery 21 is used to crank the transverse engine 2 for an M/G start-up. In the M/G start-up control, by rendering the second clutch 5 in a slip engaged state while gradually engaging the first clutch 3, the transverse engine 2 will be cranked using the motor/generator as starting motor (M/G start-up control unit).

At the time of charging to the capacitor 23, based on the output of the charge command from the hybrid control module 81, the semiconductor relay 51 of the capacitor charging circuit 41 is closed, and a capacitor charging current is selected. Thus, by introducing the power from the high voltage battery 21 into the capacitor 23 via the DC/DC converter 37, fuse 40, semiconductor relay 51, DC/DC converter 52, a short time charging takes place in accordance with the capacitor charge current. Note that the capacitor charge current is set to current 1 (for example, 15 A) as a base current. Exceptionally, the current 2 (for example, 20 A) is selectable in place of the current 1. Therefore, the charge control of the capacitor 23, while the charge command is output, using the power from the high voltage battery 21, the capacitor 23 is charged with the capacitor charging current selected.

At the time of discharge from the capacitor 23, based on the output of the natural discharge command from the hybrid control module 81, the self-discharge switch 47 of the DLC unit 45 is closed to perform self-discharge from the capacitor 23. Also, based on the output of the forced discharge command from the hybrid control module 81, by closing the forced discharge switch 48 of the DLC unit 45, the forced discharge is carried out from the capacitor 23. In the case of the forced discharge, the discharge amount per unit time is set larger than that of the natural discharge.

Thus, at the time of the forced discharge control of the capacitor 23, while the forced discharge switch 48 is closed on the basis of the forced discharge command, the electric power of the capacitor 23 is converted to the resistance heat, and discharge is performed in a shorter time than the natural discharge. As the capacitor discharge current, the current 3 is set to the basic current. As an exception, the current 4 is provided greater than the current 3.

Thus, at the time of the forced discharge control of the capacitor 23, while the discharge command is being output, the high voltage battery 21 is discharged at the selected capacitor discharge current.

Capacitor Charge and Discharge Control Operation During EV Running

As described above, in the case of one-motor-two-clutch drive system, one of the "EV mode" and "HEV mode" is selected as the drive mode. In the "EV mode", the first clutch 3 is released with the second clutch 5 engaged such that an electric vehicle mode is in place in which only the motor/generator 4 serves as driving source. On the other hand, in the "HEY mode", a hybrid vehicle mode is in place in which both clutches 3, 5 are engaged to use both transverse engine 2 and the motor/generator 4 as driving source.

Further, when transitioning from "EV mode" to "HEV mode", during the transition, the transverse engine 2 is started. As the method of this engine start-up, as described above, two ways are available, i.e., the "starter start-up" for starting the transverse engine 2 by the starter motor 1, and the "M/G start-up" for starting the transverse engine 2 by the motor/generator 4.

Therefore, using the drive mode information regarding selection between the EV mode and the HEV mode and engine start information which are characteristic of the hybrid vehicle, in the capacitor charge and discharge control in the first embodiment, the capacitor charge amount (=capacitor voltage) is managed during selection of the EV mode.

In other words, through the starter start-up using the capacitor 23 as power supply, the total M/G torque of the motor/generator 4 can be dedicated to EV running. However, in the M/G start-up enabling region, since the transverse engine 2 may be cranked by using the motor/generator 3, no need exists to use the starter start-up. Further, when using the starter start-up, if the full state of charge of the capacitor is maintained in the starter start-up requirement, the internal resistance is increased so that deterioration of the capacitor proceeds.

Therefore, as long as the operating point determined by a vehicle speed and the required driving force does not leave the M/G start-up region A and enters the starter start-up region B, by maintaining the capacitor voltage b at or below the deterioration free voltage b, priority will be given to suppress the progress of the deterioration. Therefore, the operating point is present in the M/G start-up region A with the EV mode being selected and the operating point is present in the M/G start-up region A, priority is given to prevent capacitor degradation. Further, only when the operating point deviates from the M/G start-up region A, priority is given to the starter start-up. Below, with reference to FIG. 4, a description is made of the capacitor charge and discharge control operation during EV running state.

First, during EV running, when the operating point is present in the M/G start-up region A and the capacitor voltage is at or less the deterioration free voltage b, in the flowchart in FIG. 4, control repeats the flow through steps S1, S2, S3 and End. Further, when the operating point leaves the starter start-up region B and enters the M/G start-up region A, and the capacitor voltage is at or above the deterioration free voltage b, in the flowchart in FIG. 4, control proceeds through S1, S2, S3, S4, and S5. In addition, in step S5, while the capacitor voltage is at or above the deterioration free voltage b, the flow process to steps S4, S5 is repeated. In step S4, a forced capacitor discharge is performed. In other words, upon entry of the operating point in the M/G start-up region A, the forced capacitor discharge is carried out. When the operating point is present in the M/G start-up region A, the capacitor voltage is maintained at or below the deterioration free voltage b.

On the other hand, at the time of EV running, when the operating point is present in the starter start-up region B, and the capacitor voltage is at or above the starter start-up permission voltage a, in the flowchart of FIG. 4, control repeats the flow through step S1, S2, S6 to End. Further, when the operating point transfers from the MG start-up region A to the starter start-up region B, and the capacitor voltage is less than the starter start-up permission voltage a, in the flowchart in FIG. 4, control proceeds through steps S1, S2, S6, S7, and S8. Further, in step S8, while the capacitor voltage is determined to be less than the starter start-up permission voltage a, control repeats the flow through steps S7, S8. In step S7, a capacitor recharge is carried out. In other words, upon the operating point entering the starter start-up region B, a capacitor recharging is carried out. When the operating point is present in the starter start-up region B, the capacitor voltage will be maintained at or above the starter start-up permission voltage a.

As described above, in the first embodiment, during selection of EV mode, when the operating point determined by the vehicle speed and the required driving torque is present in the M/G start-up region A, the capacitor voltage is maintained at or below the deterioration free voltage b, while the operating point determined by the vehicle speed and the required driving force is deviated from the M/G start-up region A, the capacitor is configured to be recharged to and above the starter start-up permission voltage a (steps S1 to S8 in FIG. 4).

In other words, during selection of EV mode, when the operating point is present in the M/G start-up region A, priority is given to deterioration prevention. When the operating point leaves the M/G start-up region, priority is given to the starter start-up operation for be prepared for start-up quickly.

Consequently, during selection of EV mode, while ensuring the engine start-up via M/G start-up or starter start-up, it is possible to suppress the deterioration of the capacitor 23.

In the first embodiment, when the operating point according to the vehicle speed and the required driving force is present in the starter start-up region B out of the M/G starting region A, a configuration is adopted such that the capacitor voltage is maintained at or above the starter start-up enabling or permission voltage a (step S6 to step S8 in FIG. 4).

That is, when the operating point is present in the starter start-up region B, the priority is given to the starter start-up represented by the capacitor voltage (at the starter start-up permission voltage or above).

Thus, when the operating point is present in the starter start-up region B in the EV running, it is possible to start transverse engine 2 so as to respond better to the starter start-up request.

In the first embodiment, upon the operating point according to the vehicle speed and the required driving force entering the M/G start-up region A, the capacitor is configured to be forcibly discharged to or below the deterioration free voltage b from the starter start-up permission voltage a or above (step S3 to step S5 in FIG. 4).

In other words, from the starter start-up permission voltage or above until the voltage b at which the deterioration does not proceed, the gap in the capacitor voltage is large so that, it takes a long time until the capacitor voltage decreases due to natural discharge. In contrast, upon the operating point entering the M/G start-up region A, the capacitor voltage, a forced discharge is carried out to reduce the capacitor voltage to the deterioration free voltage b or below. Thus, the capacitor voltage decreases to the deterioration free voltage b or below early so that it is possible to effectively suppress the progress of the capacitor deteriorate.

Now, a description is given of the effect.

In the control system of the FF plug-in hybrid vehicle in the first embodiment, it is possible to obtain the following effects.

(1) A control system for a hybrid vehicle (FF plug-in hybrid vehicle) having a drive system including a starter motor 1, an engine (transverse engine 2), and a motor/generator 4, and a power supply system including a high voltage battery 21 as power supply of the motor/generator 4, a capacitor 23 as power supply of the starter motor 1, and a capacitor charge and discharge control unit (hybrid control module 81) that controls charging and discharging of the capacitor 23, the control system comprising:

a starter start-up control unit (hybrid control module 81) that cranks the engine (transverse engine 2) for starter start-up using the starter motor 1 powered by the capacitor 23, an M/G start-up control unit (hybrid control module 81) that cranks the engine (transverse engine 2) for M/G start-up using the motor/generator 4 powered by the high voltage battery 21; and an engine start-up region map setting unit (FIG. 5) in which, during selection of the EV mode with the motor/generator 4 serving as driving force, an M/G start-up region A is defined by subtracting an engine cranking required torque from an EV region defined by a maximum motor output torque characteristic with respect to a vehicle speed, wherein the capacitor charge and discharge control unit (hybrid control module 81) is configured, during selection of EV mode when an operating point in accordance with the vehicle speed and the required driving force is present in the M/G start-up region A, to maintain the capacitor voltage at or below a deterioration free voltage b at which deterioration does not proceed, while, when the operating point is deviated from the M/G start-up region A, the capacitor is recharged to or above a starter start-up permission voltage (FIG. 4).

Thus, during selection of EV mode, while ensuring an engine start-up of the transverse engine 2, it is possible to suppress the progress of the capacitor deterioration 23. In addition, the capacitor 23 is charged only when necessary; the 12V system power supply can afford charge and discharge balance.

(2) The capacitor charge and discharge control unit (hybrid control module 81) is configured to maintain the capacitor voltage at or above the starter start-up permission voltage a when the operating point in accordance with the vehicle speed and the required driving force is present in the starter start-up region B deviated from the M/G start-up region A (FIG. 4).

Thus, in addition to the effect of (1), during the EV running state, when the operating point is present in the starter start-up region B, it is possible to start the transverse engine in good response to a starter start-up request.

(3) The capacitor charge and discharge control unit (hybrid control module 81) is configured, upon the operating point in accordance with the vehicle speed and the required driving force entering the M/G start-up region A, to forcibly discharge the capacitor to or below the deterioration free voltage b at which deterioration does not proceed from the starter start-up permission voltage a (FIG. 4).

Therefore, in addition to the effects of (1) and (2), when the operating point enters the M/G start-up region A, the capacitor voltage drops rapidly to or below the deterioration free voltage b to thereby suppress the progress of the capacitor deterioration.

As described above, the control system of a hybrid vehicle has been described based on the first embodiment. With respect to the specific configurations, however, the present invention is not limited thereto. Rather, according to the claims in the appended claims, without departing from the gist of the invention, design changes and additions are acceptable.

In the first embodiment, such an example is shown in which, the capacitor charge and discharge control unit is configured, during selection of EV mode when the operating point is present in the M/G start-up region A, to maintain the capacitor voltage at or below the deterioration free voltage b, and further, when the operating point is deviated from the M/G start-up region A, to recharge the capacitor to or above the starter start-up permission voltage a. However, the capacitor charge and discharge control unit may be configured, during section of EV mode when the operating point is present in the M/G start-up region A, to maintain the capacitor voltage at 0 V. Also, another example is acceptable in which the capacitor is recharged to full charge when the operating point is deviated from the M/G start-up region A.

In the first embodiment, an example is shown, in which, as the capacitor charge and discharge control unit, control of recharge and forced discharge are performed using the running mode information and the capacitor voltage information. However, as the charge and discharge control unit, another example for controlling the recharging and forced discharge may be available by using capacitance information instead of the capacitor voltage information. In other words, when assuming the charge Q, the electrostatic capacity or capacitance C, and the capacitor voltage V, the charge Q is represented by $Q=C \cdot V$. Thus, when the capacitance C is constant, the charge Q is proportional to the capacitor voltage V. Therefore, by using the charge information instead of the capacitor voltage information, the equivalent controlling may be achieved.

In the first embodiment, an example is shown for using the hybrid control module 81 as the capacitor charge and discharge control unit. However, as the capacitor charge and discharge control unit, a power supply system controller provided independently may be used. Alternatively, a power supply system capacitor charge and discharge control section may be provided in a controller other than the hybrid control module.

In the first embodiment, an example is shown in which the control system according to the present invention is applied to the FF plug-in hybrid vehicle. However, the control system according to the present invention is not limited to the FF plug-in hybrid vehicle, and can also be applied to a FR plug-in hybrid vehicle or a plug-in hybrid 4WD vehicle. In short, the present invention may be applied to a hybrid vehicle with a capacitor as a starter power supply, in which the starter start-up and the M/G start-up are available.

The invention claimed is:

1. A control system for a hybrid vehicle having a drive system including a starter motor, an engine, and a motor/generator, and a power supply system including a high voltage battery as power supply of the motor/generator, a capacitor as power supply of the starter motor, and a capacitor charge and discharge control unit that controls charging and discharging of the capacitor, the control system comprising:
   a starter start-up control unit configured to crank the engine for starter start-up using the starter motor powered by the capacitor,
   an motor/generator (M/G) start-up control unit configured to crank the engine for M/G start-up using the motor/generator powered by the high voltage battery; and
   an engine start-up region map setting unit in which, during selection of the electric vehicle (EV) mode with the motor/generator serving as driving force, an M/G start-up region is defined by subtracting an engine cranking required torque from an EV region defined by a maximum motor output torque characteristic with respect to a vehicle speed, the capacitor charge and discharge control unit being configured, during selection of EV mode when an operating point in accordance with the vehicle speed and the required driving force is present in the M/G start-up region, to maintain the capacitor voltage at or below a deterioration free voltage at which deterioration does not proceed, while, when the operating point is deviated from the M/G start-up region, the capacitor is recharged to or above a starter start-up permission voltage.

2. The control system for a hybrid vehicle as claimed in claim 1, wherein the capacitor charge and discharge control unit is further configured to maintain the capacitor voltage at or above the starter start-up permission voltage when the operating point in accordance with the vehicle speed and the required driving force is present in a starter start-up region deviated from the M/G start-up region.

3. The control system for a hybrid vehicle as claimed in claim 1, wherein the capacitor charge and discharge control unit is further configured, upon the operating point in accordance with the vehicle speed and the required driving force entering the M/G start-up region, to forcibly discharge the capacitor to or below the deterioration free voltage at which deterioration does not proceed from the starter start-up permission voltage.

4. The control system for a hybrid vehicle as claimed in claim 2, wherein the capacitor charge and discharge control unit is further configured, upon the operating point in accordance with the vehicle speed and the required driving force entering the M/G start-up region, to forcibly discharge the capacitor to or below the deterioration free voltage at which deterioration does not proceed from the starter start-up permission voltage.

* * * * *